(12) United States Patent
Alioto et al.

(10) Patent No.: US 7,612,338 B2
(45) Date of Patent: Nov. 3, 2009

(54) REAL TIME SYSTEM FOR MONITORING CONTAINERS FROM A QUAYSIDE CRANE

(75) Inventors: John I. Alioto, St. Helena, CA (US); Matthew T. Alioto, Dublin, CA (US)

(73) Assignee: Veritainer Corporation, St. Helena, CA (US)

( * ) Notice: Subject to any disclaimer, the term of this patent is extended or adjusted under 35 U.S.C. 154(b) by 300 days.

(21) Appl. No.: 11/605,530

(22) Filed: Nov. 28, 2006

(65) Prior Publication Data

US 2009/0248365 A1 Oct. 1, 2009

(51) Int. Cl.
*G01J 5/00* (2006.01)
*G08B 17/12* (2006.01)

(52) U.S. Cl. .............................. 250/336.1; 340/539.26; 340/600; 378/57

(58) Field of Classification Search .............. 250/336.1; 340/539.26, 600; 378/57
See application file for complete search history.

(56) References Cited

U.S. PATENT DOCUMENTS

| | | | |
|---|---|---|---|
| 3,608,750 A | 9/1971 | Young et al. | |
| 5,070,249 A | 12/1991 | White | |
| 5,373,538 A | 12/1994 | Grenier et al. | |
| 5,407,316 A * | 4/1995 | Coatta et al. | 414/787 |
| 5,416,330 A | 5/1995 | Abul-Faraj et al. | |
| 5,479,023 A | 12/1995 | Bartle | |
| 5,692,029 A | 11/1997 | Husseiny et al. | |
| 5,838,759 A | 11/1998 | Armistead | |
| 6,382,437 B1 * | 5/2002 | Okada et al. | 212/274 |
| 6,389,305 B1 | 5/2002 | Deban | |
| 6,395,480 B1 | 5/2002 | Hefti | |
| 6,727,506 B2 | 4/2004 | Mallette et al. | |

(Continued)

FOREIGN PATENT DOCUMENTS

CA   1262192   10/1989

(Continued)

OTHER PUBLICATIONS

ASM-345-GN Crane-Mounted Radiation Detection System. Product Specification [online]. Thermo Electron Corporation, 2003 [retrieved on Dec. 11, 2008]. Retrieved from the Internet: <URL:www.thermo.com/eThermo/CMA/PDFs/Product/productPDF_19762.pdf>.*

(Continued)

*Primary Examiner*—David P Porta
*Assistant Examiner*—Mark R Gaworecki
(74) *Attorney, Agent, or Firm*—Foley & Lardner LLP

(57) ABSTRACT

In a real time container monitoring system, a data collection computer is in communication with the control computer of a container crane. The electrical signal from each of the radiation detection units carried by the spreader of the container crane is applied to the data collection computer to store as digital data information commensurate with the electrical signal from each of the radiation detection units in response to the control signal being indicative that the container has been engaged by the twist locks. A data analysis computer is in network communication with the data collection computer to download the digital data from the data collection computer and analyze the digital data to determine whether the threat material is present in the container.

39 Claims, 8 Drawing Sheets

U.S. PATENT DOCUMENTS

| | | | |
|---|---|---|---|
| 6,768,421 | B1 | 7/2004 | Alioto et al. |
| 6,791,093 | B2 | 9/2004 | Caldwell et al. |
| 6,891,470 | B2 | 5/2005 | Bohinc |
| 6,924,487 | B2 | 8/2005 | Bolozdynya et al. |
| 6,936,820 | B2 | 8/2005 | Peoples |
| 7,026,944 | B2 | 4/2006 | Alioto et al. |
| 7,116,235 | B2 | 10/2006 | Alioto et al. |
| 7,142,109 | B1 * | 11/2006 | Frank .................... 340/539.26 |
| 2006/0006338 | A1 * | 1/2006 | D'Emilio et al. ......... 250/358.1 |
| 2006/0261942 | A1 * | 11/2006 | Frank .................... 340/539.26 |
| 2008/0122234 | A1 | 5/2008 | Alioto et al. |
| 2009/0026781 | A2 | 1/2009 | Alioto et al. |

FOREIGN PATENT DOCUMENTS

DE              3611685          10/1986

OTHER PUBLICATIONS

Siegel, "U.S. Response I: Customers Seeks to Reverse Shipping Inspection Procedures," Global Security Newswire, Nov. 18, 2002.

Robinson, "Improving Homeland Security," Advanced Technology Development Center, Oct. 25, 2002.

Krotz, "Homeland Security Gets High-Tech Help," Berkeley Lab Research Review, 2002-2003.

Shapiro, "Terminals install radiation-detection equipment," The Virginian-Pilot, Dec. 21, 2003.

Powers, "Container scanners," Digital Ship, Nov. 2002, pp. 30 and 31.

Tirschwell, "Watching for nukes," The Journal of Commerce, Jan. 13-19, 2003.

RADCOMM Systes, "Radiation Detection System," Feb. 5, 2003.

"PPPL Researchers Develop Anti-terrorism Device," PPPL Digest, Apr. 2003, pp. 1-4.

U.S. Appl. No. 12/141,025, filed Jun. 17, 2008, Yamamoto.

U.S. Appl. No. 12/227,241, filed Nov. 24, 2008, Yamamoto et al.

Technical Associates. "Radiation Scanner for Cargo Containers and Trucks." Jun. 18, 2003. www.tech-associates.com.

Aspect Scientific Production Center. "Handheld Scintillation Gamma Spectrometer.", printed Aug. 18, 2003; Website: http://aspect.dubna.ru.

SAIC Companies. "Company Overview", printed Apr. 23, 2003; Website:http://www.saic.com.

Radiation Detection Center, "Technology Fact Sheet," Lawrence Livermore National Laboratory. Obtained from internet on Aug. 18, 2003. http://www.rdc.llnl.gov.

Snell, M. "Gamma-Ray Technology: The Practical Container Inspection Alternative." Port Technology International. Website:// www.portechnology.org. Available on or before Sep. 15, 2003.

SAIC Companies. "Inspection Technologies", printed Apr. 23, 2003; Website://www.saic.com.

Richardson, et al. "New Cargo Inspection and Transportation Technology Applications." Port Technology International, Website:// www.porttechnology.org., pp. 83-89. Available on or before Sep. 15, 2003.

Saint-Gobain Crystals & Detectors. "Company Overview", Printed Feb. 3, 2003; Website http://www.bicron.com.

Scientific Text Book, "Attenuation of Radiation in Matter." Available on or before Sep. 15, 2003.

Mammone, et al. "Warning and Indicator Systems." WISE Lab, Rutgers University, PowerPoint Presentation downloaded from website http://caip.rutgers.edu/wiselab, pp. 1-15. Available on or before Dec. 12, 2005.

Wilder, J. "Radiation Bomb Detection Through Signal Analysis and Pattern Recognition." Rutgers University Center for Advanced Information Processing. PDF document downloaded from website http://informatics.umdnj.edu/institute/events/IAIMS0405/, pp. 1-16. Presentation—May 12, 2004.

\* cited by examiner

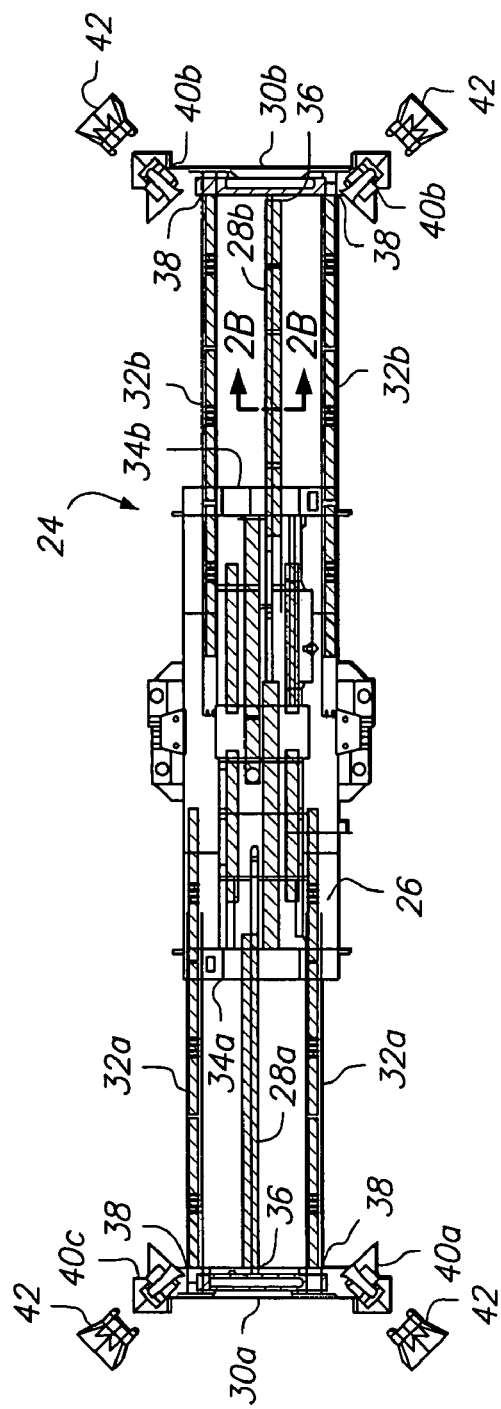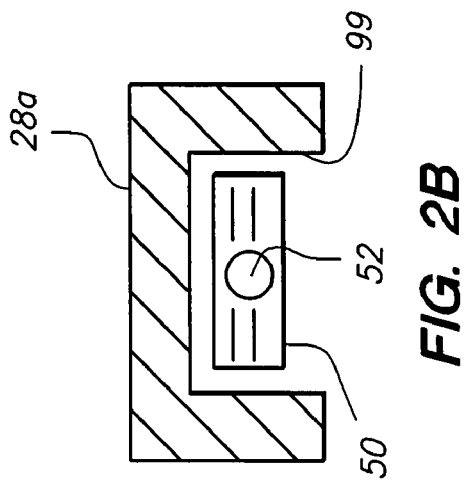

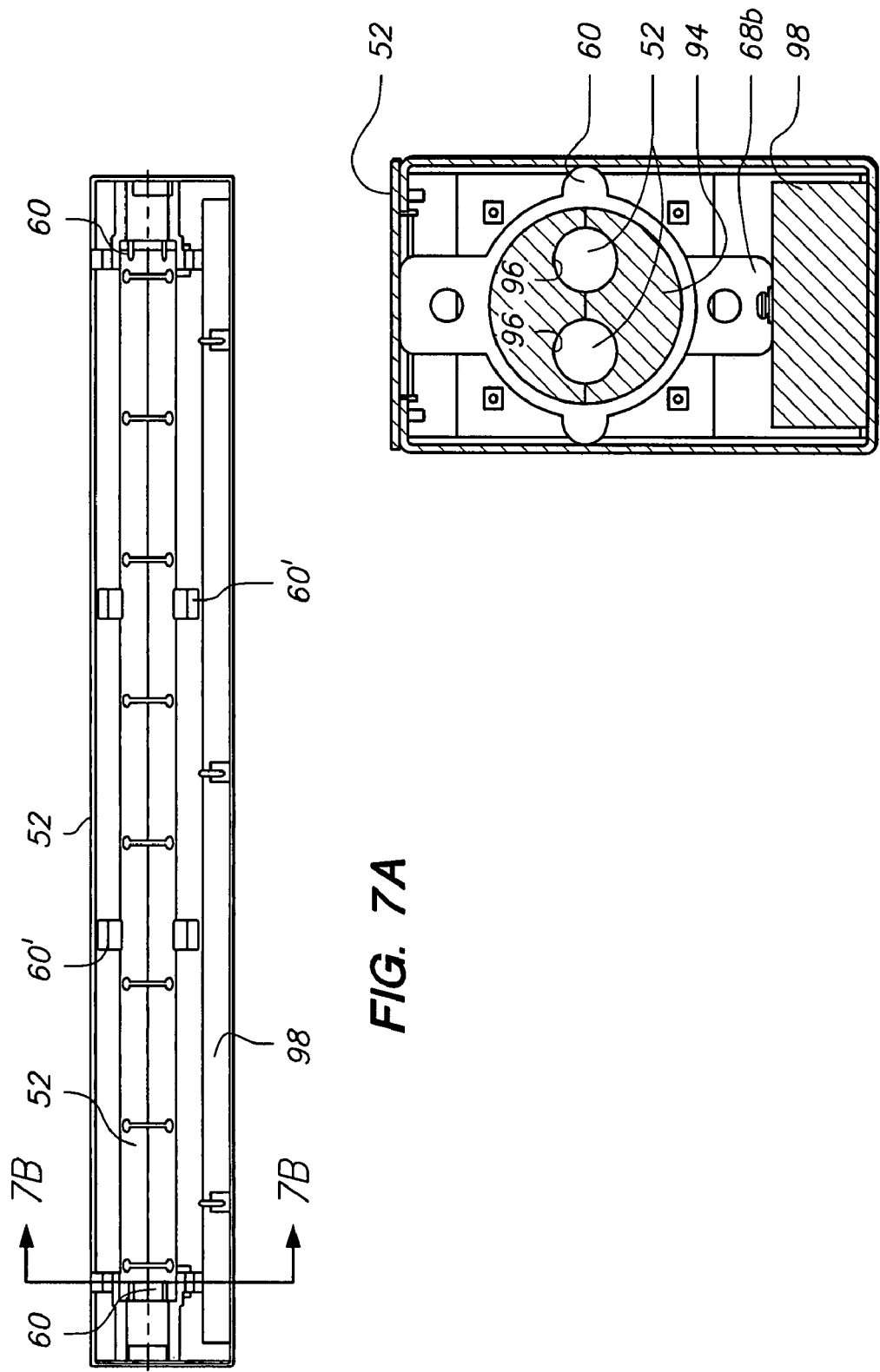

REAL TIME SYSTEM FOR MONITORING CONTAINERS FROM A QUAYSIDE CRANE

RELATED APPLICATION DATA

The present application is related to the commonly owned application for Radiation Detection Unit for Mounting a Radiation Sensor to a Container Crane, application Ser. No. 11/605,529, filed on even date herewith. In Alioto et al., Container Crane Radiation Detection Systems and Methods, U.S. Pat. No. 6,768,421 (the '421 patent), Alioto et al., "Apparatus and Method for Detecting Radiation and Radiation Shielding in Containers," U.S. Pat. No. 7,026,944 (the '944 patent), and Alioto et al., "Inverse Ratio of Gamma-Ray and Neutron Emissions in the Detection of Radiation Shielding of Containers," U.S. Pat. No. 7,116,235 (the '235 patent), new and useful apparatuses and methods for radiation scanning of shipping containers are described. The '421 patent, the '944 patent and the '235 patent are incorporated by reference as though fully set forth herein.

BACKGROUND OF THE INVENTION

1. Field of the Invention

The present invention relates generally to detection of radiation threat materials within shipping containers and, more particularly, to improvements to a spreader or hoist attachment of a container crane wherein such improvements are used for the non-invasive and passive collection of radiation data from a container engaged thereto and transmission of such data.

2. Description of the Related Art

On Sep. 11, 2001, coordinated terrorist attacks on the New York World Trade Center and on the Pentagon utilized hijacked commercial aircraft as the transport mechanism for incendiary devices, i.e., the very fuel tanks of the hijacked aircraft themselves. Upon these aircraft being deliberately crashed into these structures, their fuel tanks explosively ruptured to disperse ignited jet fuel resulting in the tragic loss of thousands of lives and total destruction of the World Trade Center Twin Towers.

These terrorist attacks have renewed defense awareness that the common transport systems of global commerce can be surreptitiously used as weapons delivery systems, particularly when such systems transport smuggled weaponry triggered to detonate when the transport device is near or arrives at an intended target. In particular, a grave concern is that radioactive weapons, which spread radioactive contamination over a relatively small area through conventional explosives, and nuclear weapons, which cause widespread destruction through the spontaneous release of high fission or fusion energy from a nuclear core, may be surreptitiously smuggled from abroad in shipping containers and detonated at the port of entry, or later when the still sealed shipping container has been transported by rail or truck to a populated inland destination.

The threat of any of these types of weapons being smuggled into a country from a foreign territory and then being detonated has been recognized since the dawn of the atomic age. In his famous letter of Aug. 2, 1939, Albert Einstein warned President Franklin Roosevelt that "(a) single bomb of this (nuclear) type, carried by boat and exploded in a port, might very well destroy the whole port together with some of the surrounding territory."

Although the threat of smuggled nuclear weapons, as foreseen by Einstein, has long been known, it was mitigated by the fact that ten years following Einstein's letter only a few of the most militarily powerful nations possessed nuclear weapon capability. The threat was further overshadowed by the more efficient long range bomber delivery and the later developed intercontinental ballistic missile delivery systems for such weapons, which through multiple simultaneous launches could deliver an almost instantaneous fatal blow to one's adversary.

Because the Cold War antagonists and their respective allies possessed symmetry in nuclear weaponry and delivery systems, the totality of the retaliatory response to be wreaked upon the aggressor first to use of such weapons resulted in the doctrine of mutually assured destruction. Under this doctrine, the initial use of a nuclear weapon through any means of delivery, even if confined to a single nuclear weapon, would be responded to with the same retaliatory response of absolute destruction to be wreaked upon the aggressor as if the initial attack was devised to deliver a fatal blow. The secondary attack in response to the retaliatory response would thus also require absolute destruction to be wreaked upon the responder to the initial attack. Thus, nuclear warfare between the Cold War antagonists was not devised to be waged symmetrically in limited tit for tat engagements thereby ensuring that even the limited use of nuclear weapons was not a viable military option.

Since the ostensible end to the Cold War, the greatest threat to the current world order is an asymmetrical one from non-state aligned terrorists, self-described as jihadists who ascribe to a nihilistic Islamic ideology, and their state sponsors. The jihadists seek through terror to cause the destruction of the nation-state economic and political order and, with the intent of global domination, to revive the Islamic caliphate, which had last been defeated in World War I and replaced by the Kemalists in Anatolia and the current nation states of the Levant and Mesopotamia.

Because such ideology is nihilistic, death to its adherents is of minimal consequence and even, at times, celebrated as long as it advances the jihadist's cause. Furthermore, the jihadists are widely dispersed and do not operate on a centralized command and control hierarchy, but operate mostly from localized cells, which through a shared ideology and use of terror as a means to achieve an end unite these cells into a global force. Moreover, the cells themselves may often be embedded in the very civilian populations they seek to terrorize. Accordingly, the threat of overwhelming retaliatory force is of little or no deterrent effect to the jihadist, thereby rendering the threat asymmetrical.

Asymmetrical warfare does not depend upon the widespread or total military destruction of the nation state. For example, a coordinated jihadist attack on just a few hubs of the global transport systems through the use of radioactive weapons, although not causing extensive loss of life or physical damage to these and their related structures, would render these hubs unusable for several years through the spread of radioactive contamination. Major disruptions in the flow of international commerce would result from such an attack, causing a global economic slowdown, if not global economic depression, thereby resulting in increased local and global political instability.

In response to this asymmetrical threat, the transport mechanisms of global commerce have recently been subject to increased monitoring and stringent security measures to minimize the chances of a radioactive weapon or nuclear device being successfully smuggled. However, one of the major problems of increased monitoring is that such monitoring may significantly overburden and substantially slow the flow of commerce. Since the rapid movement of freight is the hallmark of global commerce, a substantial slowdown in freight handling just through increased inspections partially achieves the aims of the terrorist even if no weapons were smuggled. Terrorists are cognizant of the fact that just the threat of terror causes economic disruption.

One of the basic transport mechanisms of the modern global economy is containerized shipping. Because goods move rapidly in global commerce, shipping containers have unfetteredly moved in and out of the seaports of the world with little or no inspection of their contents. For example, in 2003, the United States Government admitted that ninety-five percent (95%) of the some 30,000 shipping containers that entered U.S. ports every day were not inspected in any way. Introduced on Nov. 15, 2005, U.S. Senate Bill S.2008 stipulates that, of those containers identified by U.S. Customs and Border Protection's ("CBP's") profiling system as "high risk," less than 18% were inspected in any way.

This lack of inspection and consequent risk of nuclear smuggling extends in even greater percentages to the some 300 million shipping containers that move in and out of the ports, and over the roads and rails, of the nations of the world every year. Since shipping containers could be the transport system of choice for smuggled radiation weapons and nuclear devices, effective, broad based inspection of shipping containers is urgently required.

The surest way to prevent smuggling of radiation and nuclear weapons is physically to open and inspect each and every shipping container as it moves through all of the major transit points, that is, at each seaport, airport and border-crossing. However, it should be obvious that such large scale, invasive inspections are not economically feasible. Such rigorous inspections would result in global shipping effectively grinding to a halt because of the inability of shipping containers to pass through points of entry. The aforementioned economic disruption and instability would result from such inspections being rigorously carried out, thereby achieving the very goal of the terrorists without any weapon even being present.

To overcome the unfeasibility of physically inspecting each and every shipping container, various active and passive radiation detection systems for shipping containers have been proposed that enable containers to be inspected while in transport. For example, in the '421, '944 and '235 patents, various passive radiation detection methods and apparatus are disclosed for the non-invasive "on the fly" inspection of shipping containers.

a. Passive Versus Active Radiation Detection Devices

Both radioactive and nuclear weapons contain radioactive or fissile material. As is known, this radioactive material spontaneously emits radiation. This radiation occurs either directly from unstable atomic nuclei or as a consequence of a nuclear reaction. It comprises alpha particles, nucleons (protons and neutrons), electrons and gamma rays. As disclosed in the '421, '944 and '235 patents, this radiation can be detected by using non-invasive passive detection systems and methods.

Non-invasive passive detection systems and methods are to be distinguished from non-invasive active detection systems and methods. The critical distinguishing factor is that passive systems and methods utilize radiation that is naturally emitted from materials. Active systems and methods create a source of radiation which itself emits harmful radiation.

In an exemplary active system, a source of radiation, exemplarily gamma or neutron radiation, is aimed at the container and its contents. The radiation passes through the walls of the container and interacts with its contents. Specifically, the radiation is absorbed by the contents, such that each item of the contents of the container then gives off further gamma radiation at an energy level characteristic for each item. From a scan of the energy peaks, it can be determined if any one peak is associated with a known energy peak of a radioactive material. An active scanning system, similar to as just described, is disclosed in Armistead, U.S. Pat. No. 5,838,759.

There are serious medical moral legal and economic considerations in the use of active systems and methods. First, the source of radiation is carcinogenic and dangerous to the health and safety of workers who operate and work in the immediate area of the system. In June of 2005, the National Academy of Sciences issued a long awaited report on the biologic effects of ionizing radiation entitled "BEIR: VII Health Risks from Exposure to Low Levels of Ionizing Radiation." It states: "A comprehensive review of available biological and biophysical data supports a 'linear-no-threshold' (LNT) risk model—that the risk of cancer proceeds in a linear fashion at lower doses without a threshold and that the smallest dose has the potential to cause a small increase in risk to humans." Second, the operators of active systems face long term legal liability exposure much the same as asbestos manufacturers did in the 1970s, 1980s and 1990s. And third, organized labor and dock workers (longshoremen and teamsters) will often refuse to work around active radiation systems thus stopping the work flow altogether.

On the other hand, passive systems and methods, of the type as disclosed in the '421, '944 and '235 patents, obviate the need for a separate source of radiation by measuring the radiation that is naturally emitted from the environment, the container and the contents of the container. If an anomaly from the normally existing radiation is detected, there is an indication that the container may contain radioactive material even if an attempt has been made to shield the presence of such radioactive material by use of a radiation absorbent material. More particularly, in the disclosed passive radiation detection devices (1) gamma rays emitted by radioactive or fissile material in a shipping container that exist about a shipping container are detected and counted ("gamma count"); (2) the energy level of those detected and counted gamma rays is measured ("gamma energy"); and, (3) neutrons emitted by radioactive or fissile material in a shipping container that exist about a container may also detected and counted ("neutron count"). As more fully described in the '421, '944 and '235 patents, these three data points, i.e., gamma count, gamma energy and neutron count, can be then used to analyze and determine, within acceptable limits, what radioactive material is inside a given shipping container or if radiation absorbent material is present possibly shielding radioactive material.

Crane-Mounted (Hoist Attachment or Spreader) Radiation Detection

The hallmark of containerization is the rapid movement of freight. Any additional operation that is performed during the movement of the container from shipper to consignee slows it down and creates inefficiency. But this rapid movement creates a plain and serious security risk. A balance between efficiency and security must be reached. To achieve the optimum balance, the radiation scanning should be in the normal workflow of the container. This means that the scanning activity should take place at the same time and place when and where the container would otherwise move.

As stated in the '421 patent, the principal time and place for radiation scanning to occur "when and where the container otherwise moves" are during the loading and unloading process by the container crane. During this process, hydraulically operated male pieces called "twist locks" at the four corners of the hoist attachment or spreader of the crane attach or lock into female fittings at the four corners of the shipping container called "corner castings." In the vernacular of the art, "twist lock" is oftentimes used as the verb "to twistlock" and the spreader is then referred to as being "twistlocked onto the container." While the hoist attachment or spreader is twist-locked onto the container, the container can be lifted and moved between ship and wharfage.

Typically, the hoist attachment or spreader is twistlocked onto the container for a time period between approximately 20 seconds and 100 seconds. Thus, very little time is required in the loading and unloading process, contributing to the rapid movement of freight. When the radiation sensors are located on all four sides and the center of the underneath of the hoist attachment or spreader, as described in the '421, '944 and '235 patents, then the sensors are stationary with respect to the container and its contents. Taking advantage of this relative stationary disposition between container and sensors for a time period of between 20 and 100 seconds, the apparatus and methods of the '421, '944 and '235 patents have been designed to scan and analyze containers that have been twistlocked so that there is no degradation in the transit time of the container.

Also, while a container has been twistlocked, the hoist attachment or spreader's main body comes within 6 to 18 inches from the top of the container. Since the height of the maritime shipping container is standardized at 8½ feet and 9½ feet, the distances between the sensors and the twistlocked container, and its contents, are within the detection range of the sensors so that the radiation about the container can be measured to determine, as disclosed in the '421, '944 and '235 patents, whether radioactive material or radiation absorbent material is present in the container. By taking advantage of the distances of the radiation sensors from the container while twistlocked, along with the time duration that such container is twistlocked, the apparatus and methods disclosed in the '421, '944 and '235 patents enable radiation scanning of a container while it is still in its normal workflow.

Contrary to the disclosures of the '421, '944 and '235 patents, highly placed, U.S. Government officials have stated that crane-mounted radiation detection "does not work" because the sensors cannot be sufficiently shock absorbed. On Oct. 24, 2004, the Deputy Administrator for Defense Nuclear Nonproliferation of the U.S. Dept. of Energy cast doubt on the possibility of a crane-mounted radiation detection system stating, among other things, "[T]he systems would have to be exceptionally robust to withstand the application there."

During the loading and unloading process, the hoist attachment is brought into contact with, and twistlocked onto, the container. While twistlocked, the container is hoisted and put into place either onboard ship or dockside on the top wharfage whence the twistlocks are opened to release the hoist attachment from the container. During each of these actions, the hoist attachment is subject to impact, shock and vibrations from the forces of collisions that occur. Additionally, the accelerative forces during the loading and unloading process of the container place stresses and strains on the hoist attachment when it is twistlocked onto the container.

All of these various forces cause mechanical energy to be propagated through the hoist attachment. It has been found that this energy may be disruptive to the normal operation of the radiation sensors and may further cause their failure. Thus, although the systems and methods first described in the '412 patent have subsequently been built, tested and successfully demonstrated, a need arose for a radiation detection unit so that a radiation sensor can be mounted to a structure in which mechanical energy, otherwise disruptive to the operation of the radiation sensor, is propagated to the structure.

There are other advantages to crane-mounted (hoist attachment or spreader) radiation detection. The hoist attachment or spreader is the last piece of equipment to touch the container as it is hoisted from the wharfage and loaded onto the container ship at the originating port. The hoist attachment or spreader is also the first piece of equipment to touch the container upon arrival at the destination port. Crane-mounted (hoist attachment or spreader) radiation detection eliminates any shoreside opportunity to contaminate or compromise the container. Crane-mounted (hoist attachment or spreader) radiation detection does not use scarce terminal real estate in a wasteful, non-container-storage use. And lastly, crane-mounted radiation sensors experience varying levels of background radiation that provide additional data points from which to make content determinations.

In the event a container does contain a radioactive weapon or nuclear device that is triggered to detonate upon reaching a destination port with the intent of disabling such port, the detection systems of the '421, '944 and '235 patents, if employed only at the destination port, may not provide sufficient time to prevent the disaster from occurring should the threat be detected. Furthermore, the threat may have already been realized from detonation while the container containing the threat is still onboard the container ship prior to being scanned. As stated above, since the hoist attachment when twistlocked into a container is the last piece of equipment to touch the container when being loaded onto a ship, it is during the loading process that the scan for threat materials is preferably made to obviate the aforementioned possibility of the threat being realized at the destination port.

However, origination ports may be in countries that are hostile to the interest of the nation of the destination port, or even if each country has nominally friendly relations, the port employees may be infiltrated by terrorists or their sympathizers. Although, the country of the originating port may acquiesce to detection systems being installed at their ports for scanning of all outgoing containers through action of international treaties and protocols, the country of the originating port may not welcome or allow foreign inspection monitors to be present. Thus the possibility exists that the port employees of such country could compromise the scanning process and falsify the scan results to enable a container with threat materials to be loaded onto the ship. Accordingly, another need exists to be able to monitor remotely the scan results of containers during the loading process.

SUMMARY OF THE INVENTION

Accordingly, it is an object of the present invention to provide a radiation detection unit adapted to mount a radiation sensor to a structure in which mechanical energy disruptive to operation of said radiation sensor is propagated.

It is a related object of the present invention to provide a plurality of radiation detection units wherein each of said radiation detection units is adapted to mount a respective one of a plurality of radiation sensors to a spreader in which mechanical energy disruptive to operation of said radiation sensors is propagated.

It is a further object of the present invention to provide an apparatus for the detection of threat material in a container when engaged by the twist locks of the spreader of a container crane in response to a control signal developed by a control computer associated with such container crane.

It is yet another object of the present invention to provide a real time wide area monitoring system for the detection of a threat material in any one of a plurality of containers as such containers are hoisted between a container ship and wharfage at one of a plurality of shipping ports.

According to one embodiment of the present invention, a radiation detection unit is adapted to mount a radiation sensor, having an interface end and a collection end, to a structure in which mechanical energy disruptive to operation of the radiation sensor is propagated. The radiation detection unit includes housing and a pair of isolators of unitary construction of a mechanical energy absorbent material. The housing has an interior surface and an exterior surface. A portion of the exterior surface of the housing is adapted to be attached rigidly to the structure. Furthermore, major dimensions of the housing are selected to exceed corresponding major dimensions of the radiation sensor. Each of the isolators has a body portion and a plurality of projections extending outwardly from the body portion. The body portion of each of the isolators is adapted to engage the radiation detection sensor proximal to a respective one of the radiation collection end and the interface end. Each of the projections is disposed spatially intermediate the body portion and the interior surface of the housing and has a distal end in intimate contact with the interior surface of the housing. Accordingly, the radiation sensor when engaged by the isolators is carried in a three-dimensional spaced apart relationship to the interior surface of the housing. Moreover, a length of each of the projections between the distal end and the body portion from which each of the projections extends is selected to attenuate substantially mechanical energy that is induced at the distal end and propagates along the length of each of the projections prior to the propagated energy being incident upon the body portion from which each of the projections extends whereby the radiation sensor is isolated from the mechanical energy.

In a related aspect to the forgoing embodiment of the present invention, each of a plurality of radiation detection units, similar to the radiation detection unit described above, are adapted to mount the radiation sensor to a spreader for a container crane. The spreader typically includes a main body, a pair of actuated drawbars, a pair of gable ends and a first pair and a second pair of telescoping arms. Each of the drawbars extends outwardly from a respective opposite end of the main body and move in opposition to each other. Each of the gable ends is attached to a distal end of a respective one of the drawbars and normal thereto. The first pair and the second pair of telescoping arms extend outwardly from the respective opposite end of the main body. Furthermore, each of the first pair and the second pair of telescoping arms has a distal end attached to a respective one of the gable ends. Any one of the radiation detection units may be mounted to any of the above-described components of the spreader in which mechanical energy disruptive to operation of the radiation sensor therein is propagated.

In another embodiment of the present invention, a plurality of radiation detection units is carried by the spreader of a container crane wherein the container crane also has a control computer. The spreader has twist locks to engage and disengage a container in response to a control signal developed by the control computer. Each of the radiation detection units gathers raw emission data from radiation about the container when engaged by the spreader to develop an electrical signal commensurate with the raw data. A data collection computer is in communication with the control computer. The electrical signal from each of the radiation detection units is applied to the data collection computer to collect the electrical signal from each of the radiation detection units in response to the control signal being indicative that the container has been engaged by the twist locks. The data collection computer further stores the electrical signal from each of the radiation detection units as digital data. A data analysis computer is in network communication with the data collection computer to download the digital data from the data collection computer and analyze the digital data to determine whether the threat material is present in the container.

In a related aspect to the immediately forgoing embodiment of the present invention, a real time wide area monitoring system detects threat material in any one of a plurality of containers as such containers are hoisted between a container ship and wharfage at one of a plurality of shipping ports. Each of the ports has a plurality of container cranes and a control computer. Each of the container cranes, similarly as described above, has a spreader. The spreader of each of the container cranes has twist locks to engage and disengage one of the containers in response to a control signal developed by the control computer. The monitoring system includes the plurality of radiation detection units carried by the spreader of each of the container cranes, a plurality of data collection computers wherein each of the data collection computers is associated with a respective one of the container cranes and further is in communication with the control computer of a respective one of the ports, and a data analysis computer in network communication with each of the data collection computers. Each of the radiation detection units of the spreader of one of the container cranes gathers raw emission data from radiation about the one of the containers when engaged by the spreader of the one of the container cranes to develop an electrical signal commensurate with the raw data. The electrical signal from each of the radiation detection units of the spreader of the respective one of the container cranes is applied to the data collection computer associated with the respective one of the container cranes to collect the electrical signal from each of the radiation detection units of the spreader of the respective one of the cranes in response to the control signal developed by the control computer of the respective one of the ports being indicative that the one of the containers has been engaged by the twist locks and to store the electrical signal from each of the radiation detection units as digital data. The data analysis computer downloads the digital data from one of the data collection computers associated with the respective one of the container cranes and analyzes the digital data to determine whether the threat material is present in any one of the containers.

The radiation detection unit, as used in any embodiment of the present invention, advantageously isolates the radiation sensor from the mechanical energy propagating within structure to which the unit is attached, wherein such propagating energy is disruptive to the operation of such sensor. Accordingly, through the present invention the apparatus and methods, as disclosed in the '421, '944 and '235 patents, are improved upon and the doubt cast by the Deputy Administrator for Defense Nuclear Nonproliferation of the U.S. Dept. of Energy is addressed.

These and other objects, advantages and features of the present invention will become readily apparent to those skilled in the art from a study of the following Description of the Exemplary Preferred Embodiments when read in conjunction with the attached Drawings and appended Claims.

BRIEF DESCRIPTION OF THE DRAWING

FIG. 2A is a plan view, partially cut away and partially in cross section, of the underside of the spreader of FIG. 1;

FIG. 2B is a cross section of the spreader of FIG. 2A taken along line 2B-2B;

FIG. 7A is a perspective view of a radiation detection unit showing multiple radiation sensors within a single housing;

FIG. 7B is a cross section of the radiation detection unit and one isolator of FIG. 7A taken along line 7B-7B;

DESCRIPTION OF THE EXEMPLARY PREFERRED EMBODIMENTS

Figure 1:
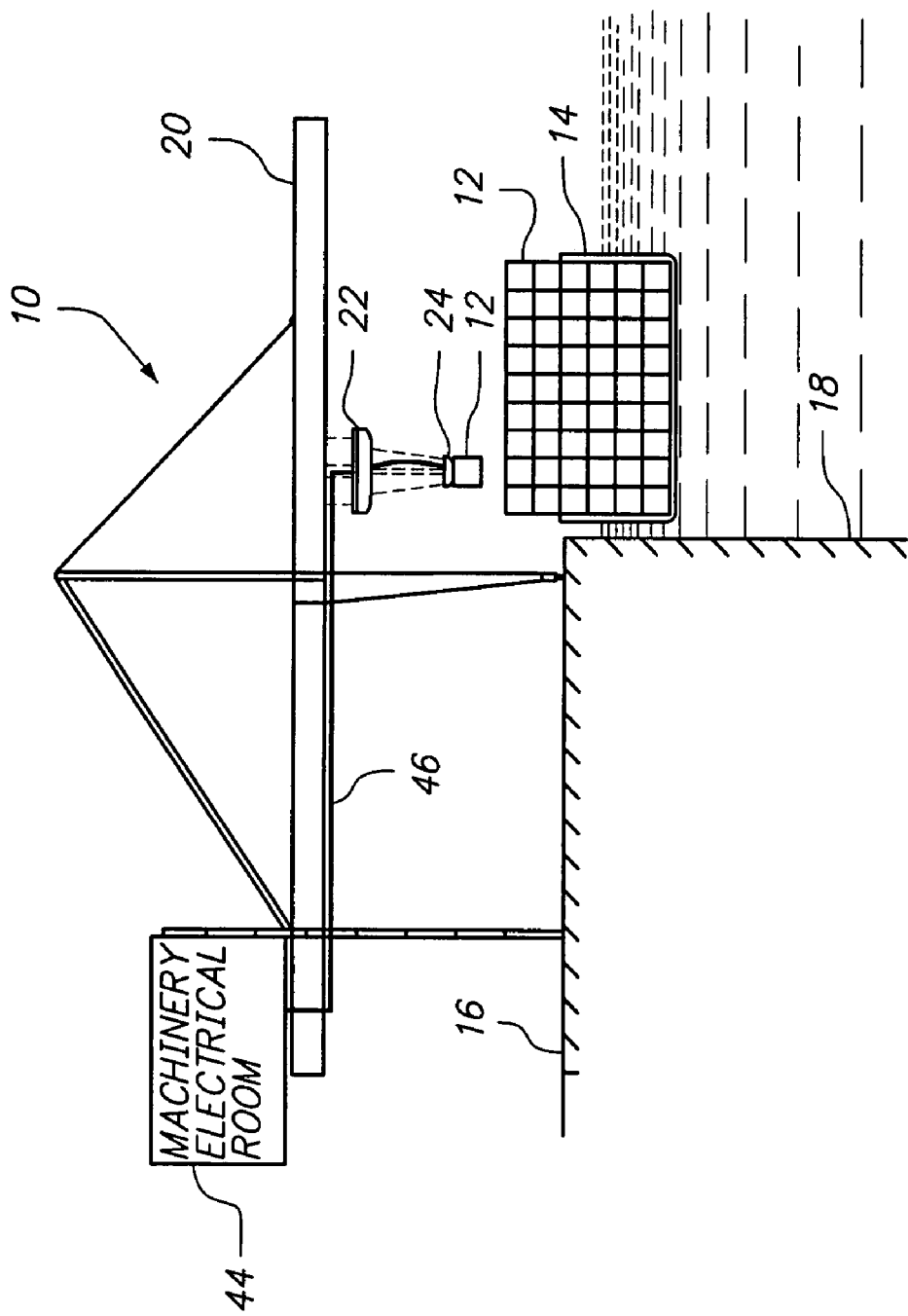
FIG. 1 is a fore-and-aft view of wharfage, a container crane assembly on the top wharfage and a container ship at the side wharfage.

Referring now to FIG. 1, there is shown a typical container crane 10 of the type employed for loading or unloading a standardized shipping container 12 to or from a container ship 14 and top wharfage 16 of the container terminal when and where the container ship 14 is docked at the side wharfage 18 associated with the container crane 10. The container crane 10 includes a gantry 20, a hoist mechanism (inclusive of a headblock) 22, and a hoist attachment, such as a spreader 24, to grasp the container 12. The spreader 24 is one particular type of hoist attachment that accommodates any size of standard lengths for the container 12.

A container terminal will generally have thereat a plurality of container cranes, each similar to the container crane 10, wherein each one of several container ships, similar to container ship 14, can be docked at the side wharfage 18 associated with each respective one of the container cranes. Accordingly, each of the shipping containers, each similar to the shipping container 12, in each of the container ships can then be loaded or unloaded, as the case may be, to or from the top wharfage 16.

With further reference to FIG. 2A, the spreader 24 includes a main body 26, a pair of actuated drawbars $28_a$, $28_b$, a pair of gable ends $30_a$, $30_b$, and a first pair of telescoping arms $32_a$ and a second pair of telescoping arms $32_b$. Each of the drawbars $28_a$, $28_b$ extends outwardly from a respective opposite end $34_a$, $34_b$ of the main body 26. Each of the gable ends $30_a$, $30_b$ is affixed to a distal end 36 transversely of a respective one of the drawbars $28_a$, $28_b$. The first pair and said second pair of telescoping arms $32_a$, $32_b$ are coextensive with a respective one of the drawbars $28_a$, $28_b$ and extend outwardly from the respective opposite end $34_a$, $34_b$ of the main body 26. Each of the first pair and the second pair of telescoping arms $32_a$, $32_b$ also has a distal end 38 attached to a respective one of the gable ends $30_a$, $30_b$.

The drawbars 28a, 28b of the spreader 24 are actuated along their length from the main body 26 in opposition to each other to adjust the spreader 24 to accommodate any of the standard lengths of the container 12 to be grasped. Accordingly, in such spreader 24 the telescoping arms $32_a$, $32_b$ are supported by the main body 26 in slidable engagement therewith. In a fixed length hoist attachment the actuated drawbars 28a, 28b are not present and the telescoping arms $32_a$, $32_b$ are fixed to the main body 26.

In the hoist attachment or spreader 24, each of the gable ends $30_a$, $30_b$ includes a pair of hydraulically actuated twist locks $40_a$, $40_b$. Each of the twist locks $40_a$, $40_b$ extends downwardly at a respective lower corner of the gable ends $30_a$, $30_b$.

Figure 3A:
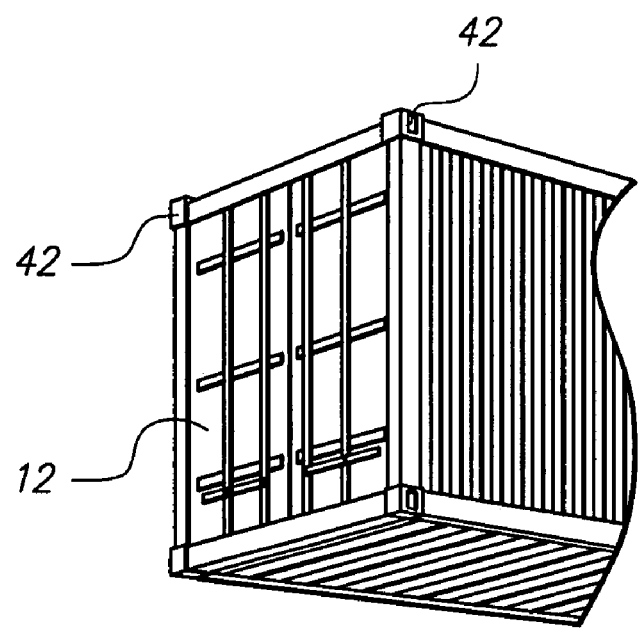
FIG. 3A is a broken perspective view of the container of FIG. 1 showing its corner castings.

With further reference to FIG. 3A, each of the shipping containers, as seen on the exemplary shipping container 12, has on each of its upper four corners thereof a corner casting 42. Each corner casting 42 is adapted to receive a respective one of the twist locks $40_a$, $40_b$ in locking engagement.

Figure 3B:
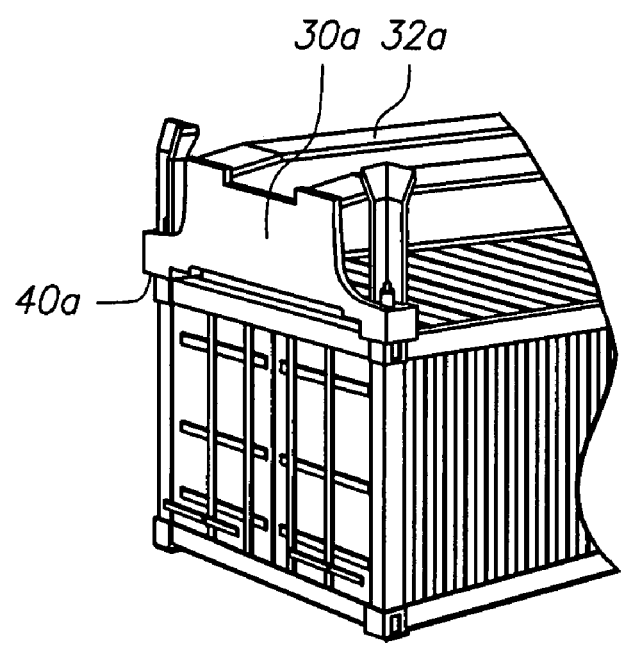
FIG. 3B is the container of FIG. 3A showing the twist locks of the spreader of FIG. 2 engaged into the corner castings of FIG. 3A.

The twist locks $40_a$, $40_b$ are "closed" when they are engaged in or twistlocked into the corner castings 12, as best seen in further reference to FIG. 3B. Similarly, the twist locks $40_a$, $40_b$ are "open" when the twist locks $40_a$, $40_b$ are disengaged from the corner castings 42 of the container 12, as seen in the exploded view relationship of FIG. 2. Accordingly, the twist locks $40_a$, $40_b$, upon closing in cooperative engagement with the corner castings 42, grasp the container 12 thereby mounting it to the hoist attachment or spreader 24 so that it may be hoisted and transported between the container ship 14 and the top wharfage 16, and upon opening release the container 12 from the hoist attachment or spreader 24.

Returning to FIG. 1, the hoist mechanism 22 actuates longitudinally along the gantry 20 so that the hoist mechanism 22 can be vertically positioned above one of the containers 12 for grasping by the hoist attachment or spreader 24, and further so that the container 12 so grasped can be moved between the top wharfage 16 and the container ship 14 for loading or unloading as the case may be. The hoist mechanism 22 further provides vertical actuation of the hoist attachment or spreader 24 so that the hoist attachment or spreader 24 can be dropped into position immediately above one of the containers 12 to be grasped by the twist locks $40_a$, $40_b$, lifted for transport of the grasped container 12 between the container ship 14 and the top wharfage 16, and then dropped again for releasing the container 12 from the twist locks $40_a$, $40_b$ upon the container being placed on the top wharfage 16 or upon another container 12 in the container ship 14.

The above-described operation of the container crane 10 is well known and the details of the actuation of the hoist mechanism 22, the draw bars $28_a$, $28_b$, and the twist locks $40_a$, $40_b$ need not be described herein. Generally, the container crane 10 further includes a machinery/electrical room 44 in which there resides a computer (not shown) that controls the electrical, mechanical and hydraulic devices that provide for the actuation of the hoist mechanism 22 draw bars $28_a$, $28_b$, and the twist locks $40_a$, $40_b$. In particular, electrical power and control signals are transmitted through a main cable and wire connector, which is known in the art as a baloney cable 46, from the computer within the machinery/electrical room 44 to the known actuating elements or means that perform the actuation of the draw bars $28_a$, $28_b$ and the twist locks $40_a$, $40_b$.

Within the machinery/electrical room 44 there may also be an interface (not shown) provided between a port facility control computer, which monitors the crane 10 and each other crane of the port facility with communication enabled over a local area network. The control computer and the interface within the machinery/electrical room 44, the port facility computer and local area network are described in greater detail hereinafter in reference to FIG. 8.

From the forgoing description, it can be appreciated by those skilled in the art that, as the hoist attachment or spreader 24 is brought into position above one of the containers 12 to be grasped, there is a high probability of collision occurring between the hoist attachment or spreader 24 and such container 12. Once the container 12 is grasped and as it is being hoisted there is also a probability of collision occurring with an adjacent container. Similarly, as the grasped container 12 is being lowered into place, there is yet another high probability of collision with the top wharfage 16 or with another container either being the container upon which the container 12 will ultimately rest or adjacent to the resting spot of the container 12. Even as the hoist attachment or spreader 24 is being twistlocked into the container 12, substantial relative motion may occur between the hoist attachment or spreader 24 and the container 12 as the twist locks $40_a$, $40_b$ grasp the corner castings 42.

Because of the mass of the spreader and the container 12, especially when fully laded to its maximum rated capacity, there are substantial forces generated by these collisions. Furthermore, as the hoist mechanism 22 is lifting the hoist attachment or spreader 24 and the container 12 in its grasp, the suspended mass develops various stresses, strains and moments within the various components of the hoist attachment or spreader 24, in particular the telescoping arms $32_a$, $32_b$. All of these forces of collision, stresses, strains and moments contribute to the propagation of mechanical energy through the structure of the hoist attachment or spreader 24. With particular applicability to the spreader 24, mechanical energy is further induced within the structure of the spreader 24 arising from actuation of the drawbars $28_a$, $28_b$.

As has become known through the teachings of the '421 patent, and subsequent tests and demonstrations, threat materials can be positively detected by radiation sensors mounted on the hoist attachment or spreader 24 itself during the time duration that the container 12 is grasped by the hoist attachment or spreader 24 while being hoisted between the top wharfage 16 and the container ship 12. To provide for greater longevity of the radiation sensors mounted to the hoist attachment or spreader 24, a radiation detection unit is disclosed hereinbelow wherein such radiation detection unit provides for substantial isolation of the radiation sensor therein from the induced mechanical energy propagated in the hoist attachment or the spreader 24 that is degrades operability of the radiation detector.

Figure 4A:
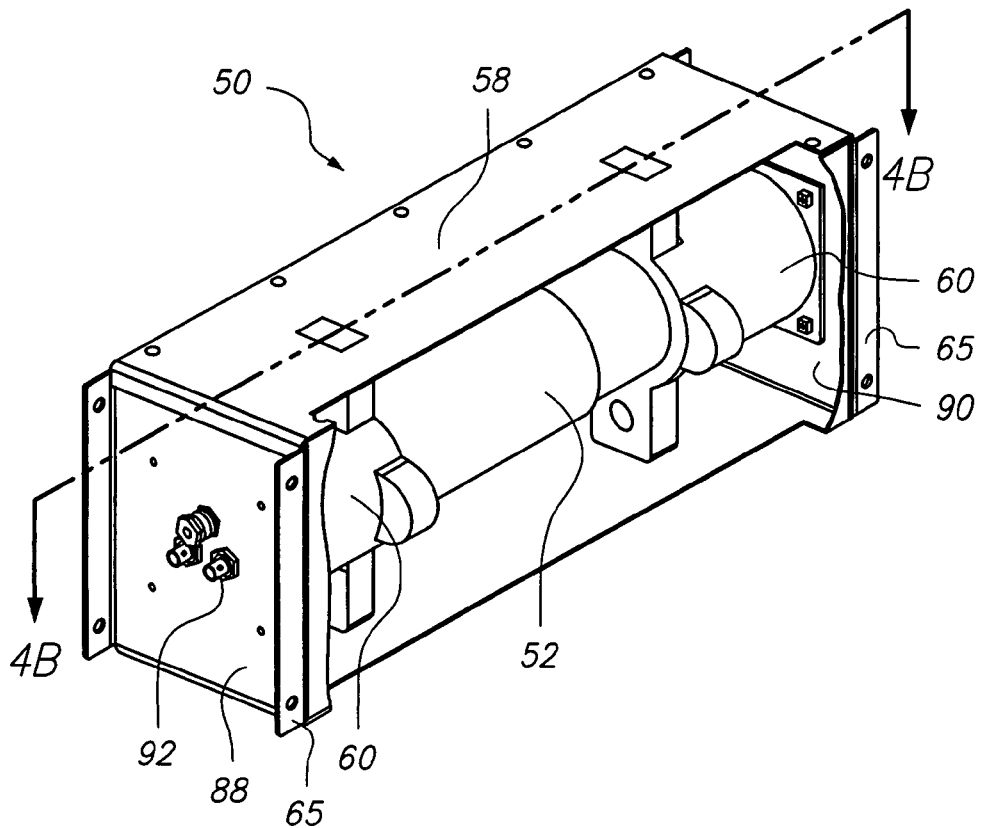
FIG. 4A is a perspective view, partially cut away, of a radiation detection unit constructed according the principles of the present invention.
Figure 4B:
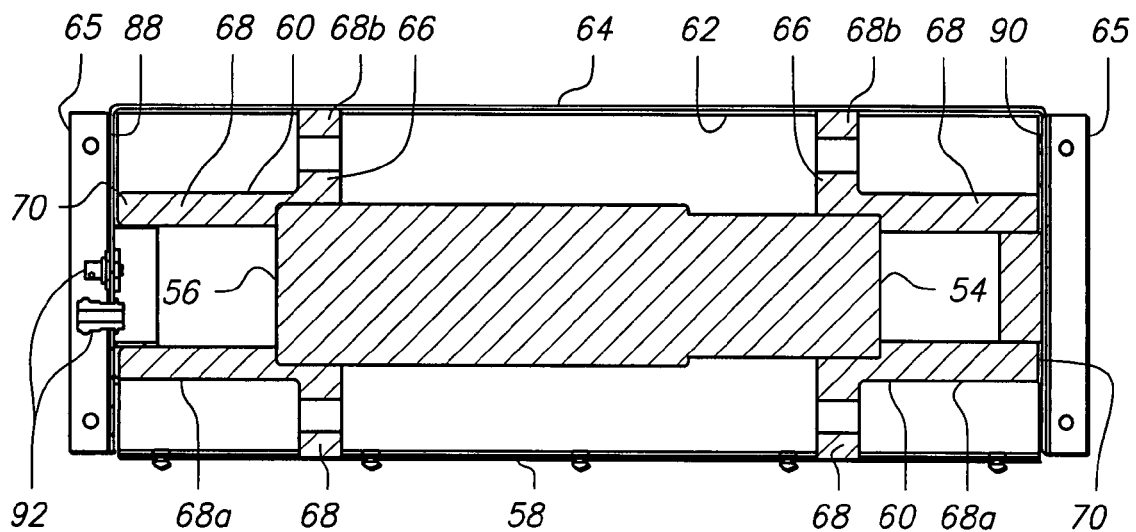
FIG. 4B is a cross section of the radiation detection unit of FIG. 4A taken along line 4B-4B.

With reference now to FIGS. 4A and 4B, there is shown a radiation detection unit 50 constructed according to the principles of the present invention. The radiation detection unit 50, when constructed as described below, will mount a radiation sensor 52 to any type of hoist attachment, such as the spreader 24, in which mechanical energy is propagated to isolate the radiation sensor were 52 from such mechanical energy. The sensor 52 typically has a radiation collection end 54 and an interface end 56. The radiation detection unit 50 includes a housing 58 and a pair of isolators 60.

The housing 58 has an interior surface 62 and an exterior surface 64. The housing 58 is adapted to be rigidly attached to the hoist attachment or spreader 24. For example, a portion of the exterior surface 64, such as a flange 65, is in intimate contact with the hoist attachment or spreader 24 upon the housing 58 being attached thereto. The major dimensions of the housing 58 are selected to exceed the corresponding major dimensions of the sensor 52.

Figure 5A:
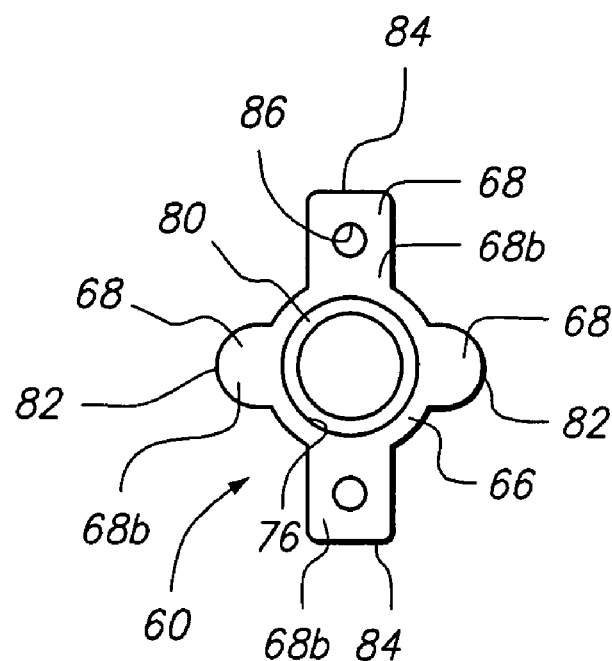
FIG. 5A is a view in elevation of an isolator of FIG. 4A.
Figure 5B:
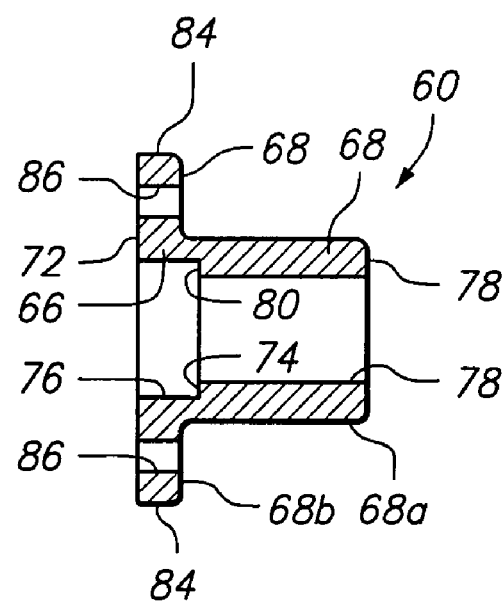
FIG. 5B is a cross section of the isolator of FIG. 5A taken along line 5B-5B.

With reference now to FIGS. 5A and 5B, each of the isolators 60 is of unitary construction and constructed from a mechanical energy absorbent material. Each of said isolators 60 has a body portion 66 and a plurality of projections 68 extending outwardly from the body portion 66. The body portion 66 of each of the isolators 60 is adapted to engage the sensor 52 proximal a respective one of its radiation collection end 54 and its interface end 56. Each one of the projections 68 is disposed spatially intermediate the body portion 66 of the same one of the isolators 60 and the interior surface 62 of the housing 58 and further has a distal end 70 in intimate contact with the interior surface 62 of the housing.

The sensor 52 when engaged by the isolators 60 is carried in a three-dimensional spaced apart relationship to the interior surface 62 of the housing 58. The length of each of the projections 68 between its distal end 70 and the body portion 66 of the isolator 60 from which each of the projections 68 extends is selected to attenuate substantially the mechanical energy that is induced at the distal end 70 of each of the projections 68 and further propagates along the length of each of the projections 68 prior to this propagated energy being incident upon the body portion of the isolator 60 from which each of the projections 68 extends. The sensor 52 is therefore substantially isolated from the mechanical energy transmitted from the hoist attachment or spreader 24 to which the housing 58 is attached.

The sensor 52 is typically elongated along its major dimension between its radiation collection end 54 and its interface end 56. Accordingly, the housing 58 is elongated along a first one of its major dimensions that corresponds to the same dimension of the sensor 52. In such embodiment, at least one projection $68_a$ of the projections 68 of each of the isolators 60 extends outwardly along the major dimension in opposition to each other. Furthermore each of these projections $68_a$ along the major dimension is configured not to interfere with the function of the radiation collection end 54 or the interface end 56 of the sensor 52, as the case may be. The overall length of the projection $68_a$ of each of isolators 60 along this major dimension together with the sensor 52 when engaged by the body portion 66 of each of the isolators 60 is dimensionally commensurate with the first major dimension of the housing 58. The remaining projections $68_b$ of each of the projections 68 of each of the isolators 60 are normal to the first major dimension.

The body portion 66 of each of the isolators 60 has a first end 72, a second end 74 and an opening 76 extending there through intermediate the first end 72 and the second end 74. The opening 76 of the body portion 66 of each of the isolators 60 is adapted at the first end 72 of the body portion 66 to receive non-interferingly the respective one of the radiation collection end 54 and the interface end 56 of the sensor 52. The projection $68_a$ of each of the isolators 60 along the first major dimension of the housing thus extends from the second end 74 of the body portion 66 thereof.

The projection $68_a$ of each of the isolators 60 extending along the first major dimension may further be dimensionally commensurate with the body portion 66 of each of the isolators 60 in all dimensions normal to the first major dimension. The projection $68_a$ of each of the isolators 60 may also have an opening 78 in communication with the opening 76 of the body portion 66.

The opening 78 of each projection $68_a$ may further be dimensionally lesser along the major dimensions normal to the first major dimension than the opening 76 of the body portion 66 such that an abutment 80 is defined at the second end 74 of the body portion 66 within the opening 76 of the body portion 66. When the sensor 52 is engaged by the body portion 66, the abutment 80 at the second end 74 of the body portion 66 of each isolator 60 abuts either its radiation collection end 54 or its interface end 56, as the case may be.

To accommodate the typical sensor 52, the opening 76 of the body portion 66 and the opening 78 of each projection 68$_a$ of each of the isolators 60 may each be a cylindrical bore coaxially aligned with each other. To form the abutment 80, a diameter of the opening 78 of the projection 68$_a$ is less than a diameter of the opening 76 of the body portion 66. Preferably, the body portion 66 and the projection 68$_a$ of each of the isolators 60 may be cylindrical.

The remaining projections 68$_b$ normal to the first dimension may be rectangular in cross-section. Furthermore, the remaining projections 68$_b$ may be arranged in pairs. The projections 68$_b$ of each pair extend from the body portion 66 in opposition to each other along a respective common dimension normal to the first major dimension.

The distal end 70 of one of the pairs of the remaining projections 68$_b$ may have an arcuate surface 82. The arcuate surface 82 is preferably axially aligned with the first major dimension such that contact with the interior surface 62 of the housing 58 is substantially linear. Moreover, the distal end 70 of the other pair of the remaining projections 68$_b$ has flat surface 84 such that contact with the interior surface 62 of the housing 58 is substantially planar.

The distal end 70 of one of the pairs of projections 68$_b$ may also have a bore 86 there through, preferably disposed in the pair of projections 68b having the flat surface 84 at its distal end 70. The bore 86, if present, may further be axially aligned with the first major dimension.

In some embodiments, the sensor 52, being elongated along the first major dimension, may require at least one further isolator, also of unitary construction and of the same material as the isolators 60. The further isolator may be similar to the isolator 60 except that the further isolator would not require the projection 68$_a$ along the first major dimension. Otherwise, such further isolator has the body portion 66 and the plurality of projections 68$_b$ extending outwardly from the body portion 66 normal to the first major dimension. The body portion 66 of such further isolator also has the opening 76 along the first major dimension that is adapted to engage a portion of the sensor 52 intermediate its radiation collection end 54 and its interface end 56. Similarly as described above, each of the projections 68$_b$ of such further isolator are disposed spatially intermediate the body portion 66 of such further isolator 60' and the interior surface 62 of the housing 58 and also have a distal end 70 in intimate contact with the interior surface 62 of the housing 58. Each of the projections 68$_b$ of such further isolator may also be arranged in pairs as hereinabove described.

Figure 6A:
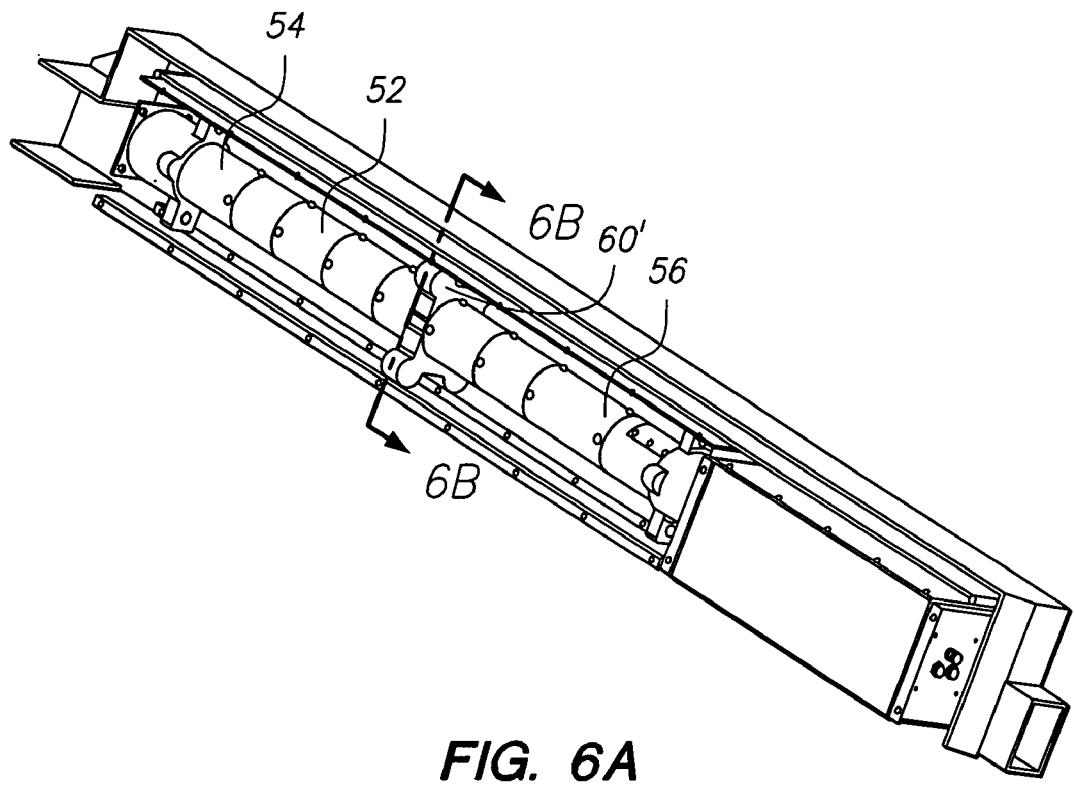
FIG. 6A is a perspective view of a radiation detection unit showing a further isolator.
Figure 6B:
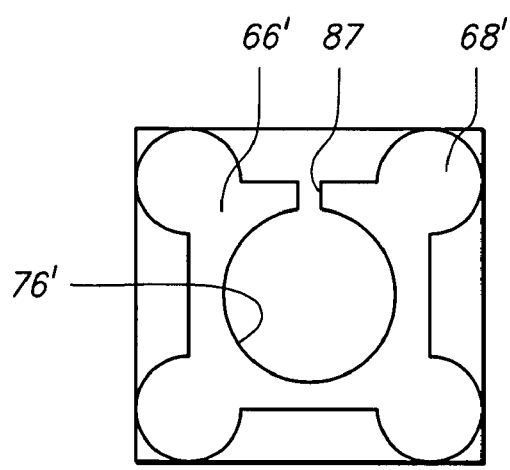
FIG. 6B is a cross section of the radiation detection unit and isolator of FIG. 6A taken along line 6B-6B.

With reference to FIGS. 6A and 6B, there is shown an alternative embodiment of a further isolator 60' useful to mount an elongated sensor 52 intermediate its radiation collection end 54 and its interface end 56. The further isolator 60' includes a body portion 66', a plurality of projections 68' extending therefrom and an opening 76' to receive the radiation sensor 52 intermediate its radiation collection end 54 and its interface end 56.

In particular, the body portion 66' of the further isolator 60' may further have a slit 87 along the major dimension so that the further isolator 60' may be spread open for placement about the sensor 52. The projections 68' may further be arcuate lobes, as best seen in FIG. 6B, dimensioned to engage the inner surface 62 of the housing 58. In the event the housing 58 is of rectangular cross section, the projections 68', when configured as arcuate lobes, may engage the inner surface 62 of the housing 58 at each corner of the rectangular cross section, also as best seen in FIG. 6B.

The isolators 60, and the further isolator 60', all as above described, are preferably constructed from a viscoelastic material. One exemplary viscoelastic material is commercially available from Sorbothane, Inc., under a trademark of the same name.

Returning to FIGS. 4A and 4B, in a further embodiment of the present invention, the housing 58 includes a first end wall 88 and a second end wall 90 opposite the first end wall 88. Each of the first end wall 88 and the second end wall 90 are substantially normal to the first major dimension of the housing 58. The distal end 70 of the projections 68$_a$ of each of the isolators 60 extend outwardly along this major dimension and are in intimate contact with a respective one of the first end wall 88 and the second end wall 90. Either of the first end wall 88 and the second end wall 90 may also include interface connectors 92 adapted to be in communication with the interface end 56 of the sensor 52. Preferably, if the first end wall 88 includes the interface connectors 92, the sensor 52 should then be carried within the housing 58 so that its interface end 56 is disposed in a facing relationship to the first end wall 88. The collection end 54 of the sensor 52 would then be in a facing relationship to the second end wall 90, which would then be configured not to interfere with radiation collection. The interface connectors 92, as is known, provide connection to the sensor 52 to a device external of the housing 58.

With further reference to FIGS. 7A and 7B, the radiation detection unit and isolators 60, or isolators 60', can also carry more than one radiation sensor 52. Instead of the sensor 52 being received within the opening 76, 76' of the isolator 60, 60', an insert 94 is coextensively received within the opening 76, 76'. The insert 94 has a plurality of openings 96 wherein each opening 96 of the insert 94 receives a portion of a respective radiation sensor 52.

The insert may be formed from the same material as the isolator 60, 60'. Furthermore, the insert 94 may be formed of HDPE neutron moderating material when each sensor 52 received in a respective opening 96 of the insert 94 detects neutron radiation or count.

Additionally, a layer 98 of the HDPE neutron moderating material may be disposed along the major dimension of the sensor 52 intermediate the inner surface 62 of the housing 58 and one of the projections 68$_b$, 68', and further in intimate contact therewith. As exemplarily seen in FIG. 7B, the flat surface of one of the projections 68$_b$ is in intimate contact with the layer 98.

The housing 58, the isolators 60, and the further isolator 60' if present, construct the various above-described embodiments of the radiation detection unit 50 such that when a portion of the housing 52, such as the flange 65, is mounted to any components of the hoist attachment or spreader 24, i.e., any of the main body 26, drawbars 28$_a$, 28$_b$, gable ends 30$_a$, 30$_b$, or telescoping arms 32$_a$, 32$_b$, the sensor 52 mounted in the radiation detection unit 50 will be substantially isolated from mechanical energy propagating in the hoist attachment or spreader 24. Moreover, the radiation detection unit 50 may further be protectively mounted to any such component of the hoist attachment or spreader 24.

Exemplarily, as seen in FIG. 2B, each one of the drawbars 28$_a$, 28$_b$ may have a radiation detection unit 50 protectively mounted thereto. To provide such protection, the radiation detection unit 50 is disposed within a generally U-shaped channel 99, such as seen in the cross-section of the drawbar 28$_a$, so that the radiation detection unit 50 does not interfere with the retraction or extension of the drawbar 28$_a$ in or out of the main body 26. Similarly, each of the other components of the hoist attachment or spreader 24, i.e., the main body 26, gable ends 30$_a$, 30$_b$ or telescoping arms 32$_a$, 32$_b$, may also have U-shaped channels, similar to U-shaped channel 99, in which additional radiation detection units 50 may be mounted to any these components in a similar manner as described to mount the radiation detection unit 50 to the drawbar 28$_a$.

The sensor 52 in each of the radiation detections units 50 may detect either gamma rays or neutrons. For example, sodium iodide (NaI) detectors that have been "ruggedized" are used for the sensor 52 when the radiation detection unit 50 is constructed for gamma-ray detection. Ruggedized NaI detectors are commercially available from various vendors, e.g., Amptek, Inc. of Bedford, Mass. Helium-3 detectors (He-3) are used for the sensor 52 when the radiation detection unit 50 is constructed for neutron detection. These He-3 detectors are also commercially available from various vendors, e.g., Saint-Gobain Crystals and Detectors of Solon, Ohio, a subsidiary of Compagnie de Saint-Gobain of Paris, France. There are many other types and suppliers of radiation detection equipment, any of which may also be used in the radiation detection unit 50. Irrespective of the make or type of radiation detection equipment used for the sensor 52, the dimensions of the housing 58 and the isolators 60, as well as the further isolator 60' if used, are selected to conform to the dimensions of the sensor 52 and the preferred magnitude of energy absorbance and attenuation in the projections 68.

Figure 8:
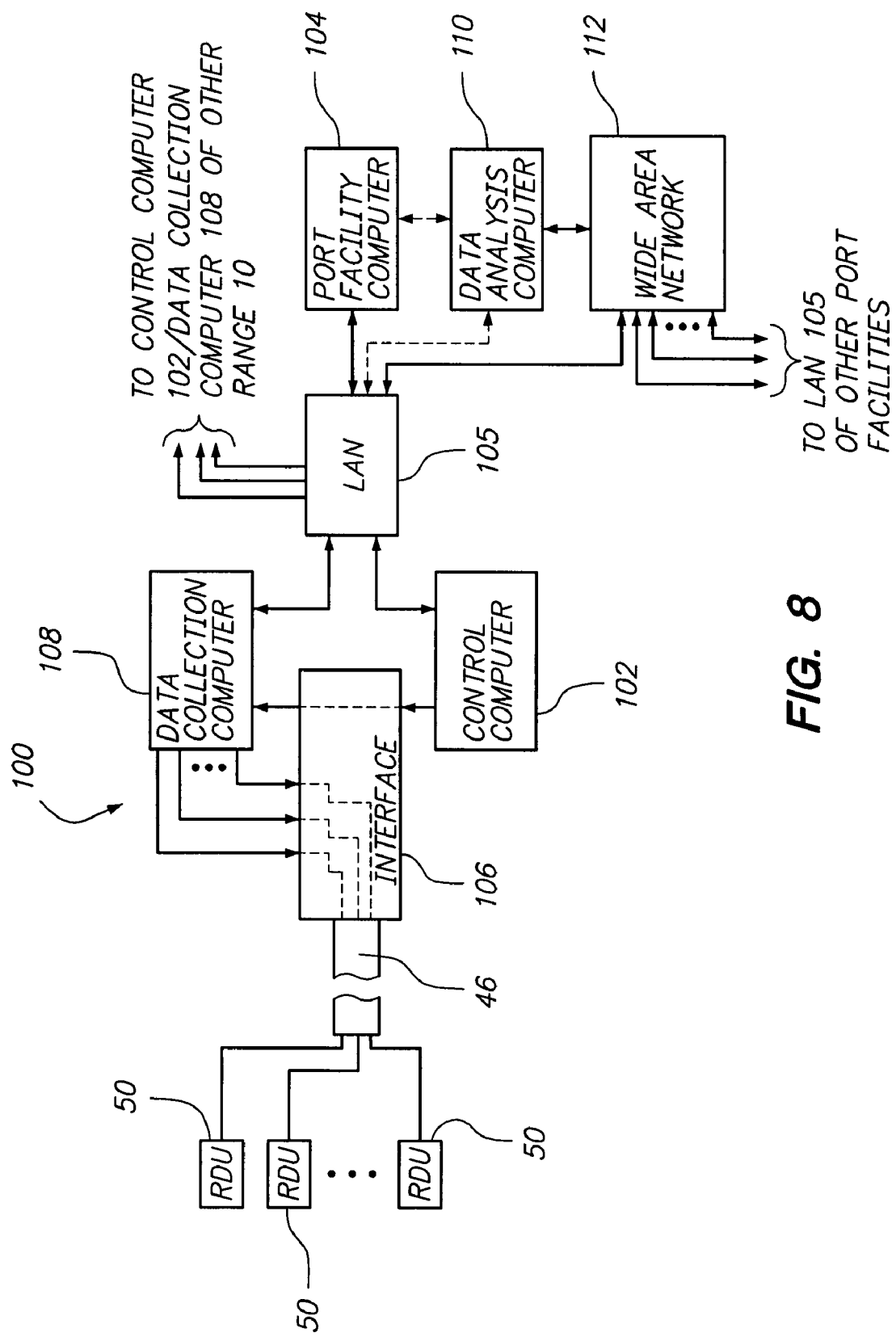
FIG. 8 is a schematic diagram of a threat detection system constructed according to the principles of the present invention.

Referring further to FIG. 8, a monitoring system 100 for detection of threat materials in the container 12 is described. The preferred environment in which the monitoring system 100 is operative includes a plurality of the radiation sensors 52 carried by the hoist attachment or spreader 24 of the container crane 10. Preferably, the radiation sensors 52 are further mounted to the hoist attachment or spreader 24 of the container crane 10 by being carried with the radiation detection units 50, which may further be disposed exemplarily as described above in reference to FIG. 2B.

As described above, the machinery/electrical room 44 of the crane 10 includes a control computer 102 and the port facility at which the crane 10 is located includes a port facility computer 104. The port facility computer communicates with the control computer 102 in the machinery/electrical room of the container crane 10 through a local area network 105. The port facility computer 104 may monitor the control computer 102 and may further collect data developed by the control computer 102, conventionally as is known.

A conventional interface 106, also in the machinery/electrical room 44 of the container crane 10, provides an interface between low voltage control signals developed at the control computer 102, which signal which respective components of the hoist attachment or spreader 24 are to be actuated, and high power currents that are conducted through the baloney cable 46 to such respective components to enable their actuation. The interface 106 may conventionally include relays or other types of high power switches responsive to the low voltage control signals.

For example, the control computer 102 develops one particular low voltage control signal, the polarity or amplitude of which determines whether the twist locks 40$_a$, 40$_b$ are to be opened or closed. At the interface 106, this low voltage control signal is utilized to switch a high power current of appropriate polarity conducted through the baloney cable 46 to the actuator(s) for the twist locks 40$_a$, 40$_b$ so that they can be opened or closed in response to this control signal. This particular low voltage control signal used for signaling actuation of the twist locks 40$_a$, 40$_b$, hereinafter referred to as the twist lock control signal, is of particular usefulness to the operation of the monitoring system 100.

The monitoring system 100 further includes a data collection computer 108 preferably disposed in the machinery/electrical room 44 of the crane 10. The twist lock control signal developed by the control computer 102 is further applied to the data collection computer, for example through a connection made within the interface 106. Accordingly, the data collection computer 108 is made cognizant of the twist lock control signal developed by the control computer 102, this signal being indicative of when the twist locks 40$_a$, 40$_b$ are in a closed or engaged position, in which the container is engaged by the hoist attachment or spreader 24 and being hoisted by the container crane 10, and also indicative of when the twist locks 40$_a$, 40$_b$ are in an opened or disengaged position. Thus, the data collection computer 108 is able to determine a time at which the twist locks 40$_a$, 40$_b$ are closed or opened and the time duration they remain closed or opened.

When operative, each of the radiation sensors 52 carried by the hoist attachment or spreader 24 detects radiation to develop an electrical signal, which may be an analog or digital signal, conveying information commensurate with the count or energy of the radiation detected. The electrical signal from each of the radiation sensors 52 carried by the hoist attachment or spreader 24 is applied to the data collection computer 108 whereat the information conveyed by the electrical signal from each of the radiation sensors 52 is stored as digital data.

During a time duration the twist lock control signal is indicative that the twist locks 40$_a$, 40$_b$ are in the engaged position, data collection computer 108 is operative to store the information conveyed by the electrical signal from each of the radiation sensors 52 as "container digital data." Container digital data may be defined as data relating to observed radiation by all of the radiation sensors 52 as the container 12 is being hoisted by the container crane 10, exemplarily in either direction between the container ship 14 and the top wharfage 16. Moreover, during a time duration the twist lock control signal is indicative that the twist locks 40$_a$, 40$_b$ are in the disengaged position, the data collection computer 108 is further operative to store the information conveyed by the electrical signal from each of the radiation sensors 52 as "background digital data." Background digital data may be defined as data relating to observed radiation by all of the radiation sensors 52 without any container 12 being present. When the monitoring system 100 is implemented in real time, the time duration in which the background digital data is obtained is preferably prior to the time duration in which the container digital data is obtained.

The electrical signal from each of the radiation sensors 52 may be electrically or optically transmitted over appropriate cable medium from their respective interface end 56 or, preferably, from the interface connectors 92 on each of the radiation detection units 50 to the data collection computer 108. Such cable medium may preferably be routed through the baloney cable 46.

The monitoring system 100 also includes a data analysis computer 110 in communication over the local area network 105 with the data collection computer 108. Alternatively, the data analysis computer 110 may reside as a software implementation within the port facility computer 104. The digital data, whether container digital data or background digital data, upon being stored in the data collection computer 108 is preferably made immediately available to the data analysis computer 110. The data analysis computer 110 is operative to analyzes such digital data to determine whether the container 12 currently engaged by the twist locks 40$_a$, 40$_b$, of the hoist attachment or spreader 24 contains any threat material. In real time, the analysis consumes the container digital data obtained as the container 12 is being hoisted, and may further consume the background digital data from a prior time duration to determine whether an analysis of such digital is indicative of threat material being present in the hoisted container 12. In the latter case, the data analysis computer 110 preferably uses the algorithms of the '421, '944 and '235 patents, however, any other known analysis algorithms can be used.

Since the data collection computer 108 is cognizant of the twist lock control signal, the data collection computer 108 may store the information conveyed by the electrical signal from each of the radiation detection units at least once or continuously during the time duration that the twist lock control signal is indicative that the twist locks $40_a$, $40_b$ are in the closed position and the container 12 engaged. Moreover, such information may be periodically stored during such time duration the twist locks $40_a$, $40_b$ are in the closed position and the container 12 engaged.

Similarly, the data collection computer 108 may store the information conveyed by the electrical signal from each of the radiation detection units at least once or continuously during the time duration that the twist lock control signal is indicative that the twist locks $40_a$, $40_b$ are in the disengaged position. Again, such information may be periodically stored during such time duration the twist locks $40_a$, $40_b$ are in the disengaged position.

As described in the '421, '944 and '235 patents, the digital data may further be stored in association with a selected one of a container identification, timestamp and radiation detection unit identification. Generally, the container identification may be obtained by a bar code scan of a bar code on the container 12 and transmitted to the control computer 102 or the port facility computer 104. The radiation detection unit identification may be obtained either from the electrical signal developed by a particular radiation detection unit 50 or from the channel in which the electrical signal is applied to the data collection computer 108. The timestamp may come from the internal clock of the data collection computer 108 although the internal clock of the port facility computer may also be utilized so that the time stamp is synchronized for all data stored in the data collection computer 108 at each of a plurality of container cranes 10 at the same port facility, as described below. In any event, the control computer 102, the port facility computer 104 and the data collection computer 108 are all in communication with each other over the local area network 105 of the port facility so that, irrespective at which of these computers the information regarding container identification, timestamp and radiation detection unit identification is originally developed, this information is available through conventional network communication protocols to the data collection computer 108.

At each port facility that has a plurality of cranes 10, the port facility computer 104 and the data analysis computer 110 are respectively in communication with the control computer 102 and the data collection computer 108 in the machinery/electrical room 44 of each container crane 10 through the local area network 105 of the port facility, as seen in FIG. 8. Accordingly, the data analysis computer 110 can communicate contemporaneously with all data collection computers 108, as is well known in the art, to download their stored digital data and further analyze the data collected at multiple data collection computers 108 to determine whether any container 12 currently engaged by the hoist attachment or spreader 24 at any of the container cranes 10 at the port facility contains threat material.

The monitoring system 100 as hereinabove described may be further extended as a real time wide area monitoring system for the detection of a threat material in any one of a plurality of containers 12 as such containers 12 are hoisted between a container ship 14 and the top wharfage 16 at any one of a plurality of port facilities. At each one of the port facilities that has one or more container cranes 10, the port facility computer 104 and the control computer 102 and the data collection computer 108 in the machinery/electrical room 44 of each one of the container cranes 10 are all in communication with the local area network 105 at such port facility, as seen in FIG. 8.

In the wide area monitoring system, the data analysis computer 110 need not reside at any port facility. Instead, the data analysis computer 110 can communicate over a wide area network 112, for example the Internet, with the local area network 105 of each of the port facilities to communicate with the data collection computer 108 in the machinery/electrical room 44 of each of the container cranes 10 of each of the port facilities, such communications being within the ordinary skill of the art. Hence, the data analysis computer 110 can download in real time the digital data stored at the data collection computer 108 of each of the container cranes 10 at each of the port facilities and analyze such data to determine if any container currently engaged by the spreader 24 of any container crane 10 of any port facility contains threat material using the analysis as described above.

Through the above described apparatus and methods of the present invention, it is possible for a data analysis computer 110, located anywhere in the United States or in any other country, to monitor containers 12 during the time duration they are engaged by the spreader 24 as being loaded from a top wharfage 16 to a container ship 14 at any port facility located anywhere in the world. Since threat materials are most likely to be placed in a container 12 originating in a territory where state or non-state actors have open hostility to the interest of the United States, threat materials in the container 12 can be detected while the container 12 is in the process of being loaded onto the container ship 14 at the port facility of such territory. Accordingly, the container 12 with threat materials can be confiscated and the threat material removed prior to the such container 12 embarking from its port of origin, thereby minimizing the risk that a container 12 containing threat materials would ever reach its port of destination whereat the threat is to be consummated.

There have been described hereinabove novel apparatuses and methods to establish real time domain awareness of the container shipping terminals and to monitor and analyze the radioactive material content, if any, of the containers loaded and unloaded at those terminals. Those skilled in the art may now make numerous uses of and departures from the hereinabove described embodiments without departing from the inventive principles disclosed herein. Accordingly, the present invention is to be defined solely by the lawfully permissible scope of the appended Claims.

What is claimed as the invention is:

1. A real time monitoring system for the detection of threat material in one of a plurality of containers as each one of said containers is being hoisted by a container crane, said container crane having a hoist attachment and a control computer operative to develop a twist lock control signal, said hoist attachment having twist locks that are actuated between an engaged position and a disengaged position in response to said twist lock control signal, said monitoring system:

a plurality of radiation sensors carried by said hoist attachment, each of said radiation sensors in response to detected radiation being operative to develop an electrical signal conveying information commensurate with said detected radiation;

a data collection computer, said twist lock control signal and said electrical signal from each of said radiation sensors being applied to said data collection computer wherein, during a time duration in which said twist lock control signal is indicative that said twist locks are in said engaged position such that a current one of said containers is grasped by said hoist attachment, said data collection computer is operative to store at least once said information conveyed by said electrical signal from each of said radiation sensors as container digital data; and a data analysis computer in communication with said data collection computer wherein said container digital data when stored in said data collection computer is made available in real time at said data analysis computer, said data analysis computer being operative to analyze said container digital data to determine whether said container digital data upon analysis thereof is indicative of said threat material being present in said current one of said containers.

2. A monitoring system as set forth in claim 1 wherein said data collection computer is further operative to store periodically said information conveyed by said electrical signal from each of said radiation sensors during said time duration.

3. A monitoring system as set forth in claim 1 wherein during a prior time duration in which said twist lock control signal is indicative that said twist locks are in said disengaged position said data collection computer is further operative to store at least once said information conveyed by said electrical signal from each of said radiation sensors as background digital data, and further wherein said background digital data when stored in said data collection computer is made available in real time at said data analysis computer, said data analysis computer being further operative to analyze said container digital data and said background digital data to determine whether said container digital data and said background digital data upon analysis thereof is indicative of said threat material being present in said current one of said containers.

4. A monitoring system as set forth in claim 3 wherein said data collection computer is further operative to store periodically said information conveyed by said electrical signal from each of said radiation sensors during said prior time duration.

5. A monitoring system as set forth in claim 1 wherein said data collection computer is further operative to store in association with said container digital data a selected one of a container identification for said current one of said containers, a timestamp at which said container digital data is stored and a radiation sensor identification associated with each of said radiation sensors.

6. A monitoring system as set forth in claim 5 further comprising a port facility computer and a local area network, each of said control computer, said port facility computer and said data collection computer being in communication over said local area network with a selected one other of said control computer, said port facility computer and said data collection computer, a selected one of said control computer and said port facility computer being operative to obtain a selected one of said container identification and said timestamp wherein said selected one of said container identification and said timestamp are made available to said data collection computer over said local area network.

7. A monitoring system as set forth in claim 5 wherein said electrical signal from each of said radiation sensors further conveys information of said radiation sensor identification at which said electrical signal is developed.

8. A monitoring system as set forth in claim 5 wherein said radiation sensor identification is obtained from a channel on which said electrical signal developed from said associated one of said radiation sensors is applied to said data collection computer.

9. A monitoring system as set forth in claim 1 further comprising a local area network, said data collection computer being in communication with said data analysis computer over said local area network.

10. A monitoring system as set forth in claim 9 further comprising a port facility computer in communication over said local area network to monitor said control computer, said data analysis computer being a software implementation within said port facility computer.

11. A monitoring system as set forth in claim 1 wherein said container crane further includes a machinery/electrical room and an interface in said machinery/electrical room, said twist lock control signal being applied to said interface by said control computer and further applied to said data collection computer through a connection in said interface.

12. A monitoring system as set forth in claim 11 wherein said data collection computer and said control computer are disposed in said machinery/electrical room.

13. A monitoring system as set forth in claim 1 wherein each of said radiation sensors is further operative to develop continuously said electrical signal.

14. A real time monitoring system for the detection of threat material in one of a plurality of containers as each of said containers is being hoisted at a port facility, said port facility having a plurality of container cranes to hoist said containers, each of said container cranes having a hoist attachment and a control computer associated with said hoist attachment, said control computer of each of said container cranes being operative to develop a twist lock control signal, said hoist attachment of each of said container cranes having twist locks that are actuated between an engaged position and a disengaged position in response to said twist lock control signal developed by said control computer associated with said hoist attachment of each of said container cranes, said monitoring system comprising:

a plurality of radiation sensors carried by said hoist attachment of each of said container cranes, each of said radiation sensors in response to detected radiation being operative to develop an electrical signal conveying information commensurate with said detected radiation;

a plurality of data collection computers, each of said data collection computers being associated with a respective one of said container cranes, said twist lock control signal developed by said control computer associated with said hoist attachment of said respective one of said container cranes and said electrical signal from each of said radiation sensors carried by said hoist attachment of said respective one of said container cranes being applied to said data collection computer associated with said respective one of said container cranes wherein, during a time duration said twist lock control signal developed by said control computer associated with said hoist attachment of said respective one of said container cranes is indicative that said twist locks of said hoist attachment of said respective one of said container cranes are in said engaged position such that a current one of said containers is grasped by said hoist attachment of said respective one of said container cranes, each of said data collection computers associated with said respective one of said container cranes is operative to store at least once said information conveyed by said electrical signal from each of said radiation sensors carried by said hoist attachment of said respective one of said container cranes as container digital data; and a data analysis computer in communication with each of said data collection computers wherein said container digital data when stored in each of said data collection computers is made available in real time to said data analysis computer, said data analysis computer being operative to analyze said digital data from each of said data collection computers to determine whether said container digital data from each of said data collection computers associated with said respective one of said container cranes upon analysis thereof is indicative of said threat material being present in said current one of said containers grasped by said hoist attachment of said respective one of said container cranes.

15. A monitoring system as set forth in claim 14 wherein said data collection computer associated with each respective one of said container cranes periodically stores said information conveyed by said electrical signal from each of said radiation sensors carried by said hoist attachment of each respective one of said container cranes during said time duration.

16. A monitoring system as set forth in claim 14 wherein during a prior time duration in which said twist lock control signal is indicative that said twist locks are in said disengaged position said data collection computer is further operative to store at least once said information conveyed by said electrical signal from each of said radiation sensors as background digital data, and further wherein said background digital data when stored in each of said data collection computers is made available in real time at said data analysis computer, said data analysis computer being further operative to analyze said container digital data and said background digital data from each of said data collection computers to determine whether said container digital data and said background digital data from each of said data collection computers upon analysis thereof is indicative of said threat material being present in said current one of said containers grasped by said hoist attachment of said respective one of said container cranes.

17. A monitoring system as set forth in claim 16 wherein each of said data collection computers associated with each respective one of said container cranes is further operative to store periodically said information conveyed by said electrical signal from each of said radiation sensors carried by said hoist attachment of each respective one of said container cranes during said further time duration.

18. A monitoring system as set forth in claim 14 wherein each of said data collection computers associated with each respective one of said container cranes is further operative to store in association with said container digital data therein a selected one of a container identification for said current one of said containers grasped by said hoist attachment of said respective one of said container cranes, a timestamp at which said container digital data is stored in each of said data collection computers associated with each respective one of said container cranes and a radiation sensor identification associated with each of said radiation sensors carried by said hoist attachment of said respective one of said container cranes.

19. A monitoring system as set forth in claim 18 further comprising a port facility computer and a local area network, said control computer associated with said hoist attachment of each respective one of said container cranes, said port facility computer and said each of said data collection computers associated with each respective one of said container cranes being in communication over said local area network with a selected one other of said control computer associated with said hoist attachment of each respective one of said container cranes, said port facility computer and each of said data collection computers associated with each respective one of said container cranes, a selected one of said control computer associated with said hoist attachment of each respective one of said container cranes and said port facility computer being operative to obtain a selected one of said container identification for said current one of said containers grasped by said hoist attachment of said respective one of said container cranes and said timestamp at which said container digital data is stored in each of said data collection computers associated with each respective one of said container cranes wherein said selected one of said container identification for said current one of said containers grasped by said hoist attachment of said respective one of said container cranes and said timestamp at which said container digital data is stored in each of said data collection computers associated with each respective one of said container cranes are made available to each of said data collection computers associated with each respective one of said container cranes over said local area network.

20. A monitoring system as set forth in claim 18 wherein said electrical signal from each of said radiation sensors carried by said hoist attachment of said respective one of said container cranes further conveys information of said radiation sensor identification at which said electrical signal is developed.

21. A monitoring system as set forth in claim 18 wherein said radiation sensor identification is obtained from a channel on which said electrical signal is applied to said each of said data collection computers associated each respective one of said container cranes.

22. A monitoring system as set forth in claim 14 further comprising a local area network, each of said data collection computers associated with each respective one of said container cranes being in communication with said data analysis computer over said local area network.

23. A monitoring system as set forth in claim 22 further comprising a port facility computer in communication over said local area network to monitor said control computer associated with said hoist attachment of each respective one of said container cranes, said data analysis computer being a software implementation within said port facility computer.

24. A monitoring system as set forth in claim 14 wherein each of said container cranes further includes a machinery/electrical room and an interface in said machinery/electrical room of a same one of said container cranes, said twist lock control signal developed by said control computer associated with said hoist attachment of said same one of said container cranes being applied to said interface at said same one of said container cranes and further applied to one of said data collection computers associated with said same one of said container cranes through a connection in said interface of said same one of said container cranes.

25. A monitoring system as set forth in claim 24 wherein said one of said data collection computers associated with said same one of said container cranes and said control computer associated with said hoist attachment of said same one of said container cranes are disposed in said machinery/electrical room at said same one of said container cranes.

26. A monitoring system as set forth in claim 14 wherein each of said radiation sensors is further operative to develop continuously said electrical signal.

27. A real time wide area monitoring system for the detection of threat material in one of a plurality of containers as each of said containers is hoisted between a container ship and wharfage at one of a plurality of port facilities, each of said port facilities having a plurality of container cranes to hoist said containers, each of said container cranes having a hoist attachment and a control computer associated with said hoist attachment, said control computer of each of said container cranes being operative to develop a twist lock control signal, said hoist attachment of each of said container cranes having twist locks that are actuated between an engaged position and a disengaged position in response to said twist lock control signal developed by said control computer associated with said hoist attachment of each of said container cranes, said monitoring system comprising:

a plurality of radiation sensors carried by said hoist attachment of each of said container cranes, each of said radiation sensors in response to detected radiation being operative to develop an electrical signal conveying information commensurate with said detected radiation;

a plurality of data collection computers, each of said data collection computers being associated with a respective one of said container cranes, said twist lock control signal and said electrical signal from each of said radiation sensors of said hoist attachment of said respective one of said container cranes being applied to said data collection computer associated with said respective one of said container cranes wherein, during a time duration said twist lock control signal developed by said control computer associated with said hoist attachment of said respective one of said container cranes is indicative that said twist locks of said hoist attachment of said respective one of said container cranes are in said engaged position such that a current one of said containers is grasped at said respective one of said container cranes, one of said data collection computers associated with said respective one of said container cranes is operative to store at least once said information conveyed by said electrical signal from each of said radiation sensors of said hoist attachment of said respective one of said container cranes as container digital data; and a data analysis computer in wide area network communication with each of said data collection computers wherein said container digital data when stored in each of said data collection computers is made available in real time to said data analysis computer, said data analysis computer being operative to analyze said digital data from each of said data collection computers to determine whether said container digital data from said one of said data collection computers associated with said respective one of said container cranes to determine whether said container digital data from said one of said data collection computers associated with said respective one of said container cranes upon analysis thereof is indicative of said threat material being present in said current one of said containers.

28. A monitoring system as set forth in claim 27 wherein said data collection computer associated with each respective one of said container cranes periodically stores said information conveyed by said electrical signal from each of said radiation sensors carried by said hoist attachment of each respective one of said container cranes during said time duration.

29. A monitoring system as set forth in claim 27 wherein during a prior time duration in which said twist lock control signal is indicative that said twist locks are in said disengaged position said data collection computer is further operative to store at least once said information conveyed by said electrical signal from each of said radiation sensors as background digital data, and further wherein said background digital data when stored in each of said data collection computers is made available in real time at said data analysis computer, said data analysis computer being further operative to analyze said container digital data and said background digital data from each of said data collection computers to determine whether said container digital data and said background digital data from each of said data collection computers upon analysis thereof is indicative of said threat material being present in said current one of said containers grasped by said hoist attachment of said respective one of said container cranes.

30. A monitoring system as set forth in claim 29 wherein each of said data collection computers associated with each respective one of said container cranes is further operative to store periodically said information conveyed by said electrical signal from each of said radiation sensors carried by said hoist attachment of each respective one of said container cranes during said further time duration.

31. A monitoring system as set forth in claim 27 wherein each of said data collection computers associated with each respective one of said container cranes is further operative to store in association with said container digital data therein a selected one of a container identification for said current one of said containers grasped by said hoist attachment of said respective one of said container cranes, a timestamp at which said container digital data is stored in each of said data collection computers associated with each respective one of said container cranes and a radiation sensor identification associated with each of said radiation sensors carried by said hoist attachment of said respective one of said container cranes.

32. A monitoring system as set forth in claim 31 further comprising a port facility computer and a local area network, said control computer associated with said hoist attachment of each respective one of said container cranes, said port facility computer and said each of said data collection computers associated with each respective one of said container cranes being in communication over said local area network with a selected one other of said control computer associated with said hoist attachment of each respective one of said container cranes, said port facility computer and each of said data collection computers associated with each respective one of said container cranes, a selected one of said control computer associated with said hoist attachment of each respective one of said container cranes and said port facility computer being operative to obtain a selected one of said container identification for said current one of said containers grasped by said hoist attachment of said respective one of said container cranes and said timestamp at which said container digital data is stored in each of said data collection computers associated with each respective one of said container cranes wherein said selected one of said container identification for said current one of said containers grasped by said hoist attachment of said respective one of said container cranes and said timestamp at which said container digital data is stored in each of said data collection computers associated with each respective one of said container cranes are made available to each of said data collection computers associated with each respective one of said container cranes over said local area network.

33. A monitoring system as set forth in claim 31 wherein said electrical signal from each of said radiation sensors carried by said hoist attachment of said respective one of said container cranes further conveys information of said radiation sensor identification at which said electrical signal is developed.

34. A monitoring system as set forth in claim 31 wherein said radiation sensor identification is obtained from a channel on which said electrical signal is applied to said each of said data collection computers associated each respective one of said container cranes.

35. A monitoring system as set forth in claim 27 further comprising a local area network, each of said data collection computers associated with each respective one of said container cranes being in communication with said data analysis computer over said local area network.

36. A monitoring system as set forth in claim 35 further comprising a port facility computer in communication over said local area network to monitor said control computer associated with said hoist attachment of each respective one of said container cranes, said data analysis computer being a software implementation within said port facility computer.

37. A monitoring system as set forth in claim 27 wherein each of said container cranes further includes a machinery/electrical room and an interface in said machinery/electrical room of a same one of said container cranes, said twist lock control signal developed by said control computer associated with said hoist attachment of said same one of said container cranes being applied to said interface at said same one of said container-cranes and further applied to one of said data collection computers associated with said same one of said container cranes through a connection in said interface of said same one of said container cranes.

38. A monitoring system as set forth in claim 37 wherein said one of said data collection computers associated with said same one of said container cranes and said control computer associated with said hoist attachment of said same one of said container cranes are disposed in said machinery/electrical room at said same one of said container cranes.

39. A monitoring system as set forth in claim 27 wherein each of said radiation sensors is further operative to develop continuously said electrical signal.

* * * * *